Figure 1:
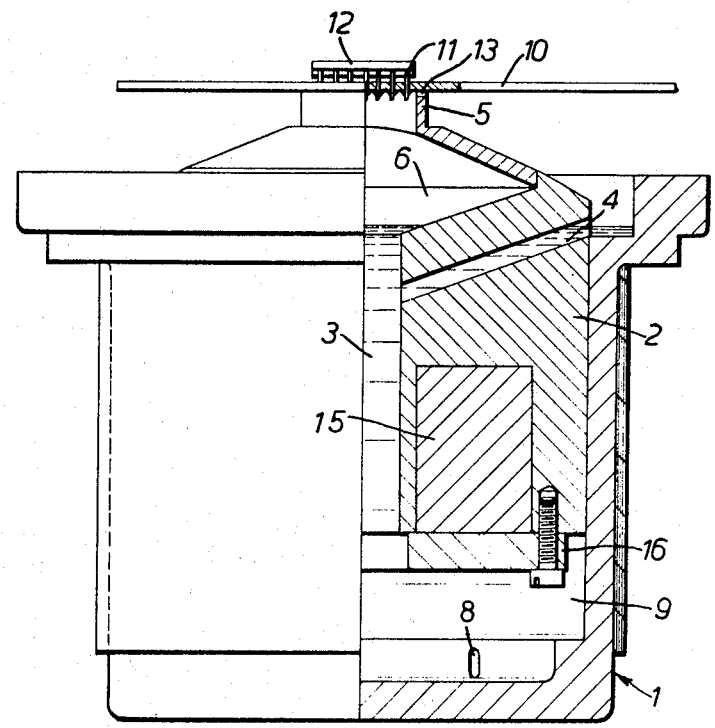

United States Patent

[11] 3,629,543

| [72] | Inventors | Antony James Mayhew<br>Billericay;<br>Leonard Frederick Cheale, Braintree, both<br>of England |
|------|-----------|-----------------------------------------------------------------------------------------------|
| [21] | Appl. No. | 50,714 |
| [22] | Filed     | June 29, 1970 |
| [45] | Patented  | Dec. 21, 1971 |
| [73] | Assignee  | The Marconi Company Limited<br>London, England |
| [32] | Priority  | June 27, 1969 |
| [33] |           | Great Britain |
| [31] |           | 32,520/69 |

[54] SOLDERING AND UNSOLDERING MACHINES
10 Claims, 3 Drawing Figs.

[52] U.S. Cl. ................................................. 219/85,
  118/3, 219/421, 228/40
[51] Int. Cl. ................................................. B23k 1/02
[50] Field of Search ....................................... 219/85,
  421; 228/19, 52, 43, 36, 40; 118/3

[56] References Cited
UNITED STATES PATENTS

| 3,190,260 | 6/1965 | Merker ........................... | 118/3 |
| 1,071,637 | 8/1913 | Ford ............................... | 118/3 X |
| 1,654,910 | 1/1928 | Barbier .......................... | 219/85 |
| 767,465   | 8/1904 | Wirth et al. ................... | 228/33 |
| 3,359,132 | 12/1967 | Wittmann ..................... | 228/36 |
| 3,172,781 | 3/1965 | Grill ............................... | 228/36 |
| 3,084,649 | 4/1963 | Parstorfer ..................... | 228/19 |

Primary Examiner—J. V. Truhe
Assistant Examiner—L. A. Schutzman
Attorney—Baldwin, Wight & Brown ABSTRACT: This invention provides a machine for simultaneously soldering or unsoldering a multiple connection component on a printed circuit board. The machine consists of a pot suitable for holding liquid at a temperature above the melting point of solder. A piston is fitted in the pot, and there is a channel passing through the piston. When the piston is depressed the hot liquid held in the pot rises up through the channel. The component to be soldered or unsoldered is positioned so that the surface of the hot displaced liquid comes in contact with the joints to be soldered or unsoldered.

PATENTED DEC 21 1971

3,629,543

SHEET 1 OF 2

INVENTORS
Antony James Mayhew
and
Leonard Frederick Cheale
BY Baldwin, Wight, Diller & Brown ATTORNEYS

PATENTED DEC 21 1971 3,629,543

SHEET 2 OF 2

INVENTORS
Antony James Mayhew
and
Leonard Frederick Cheale
BY Baldwin, Wight, Diller & Brown ATTORNEYS

SOLDERING AND UNSOLDERING MACHINES

This invention relates to soldering and unsoldering machines and more particularly to soldering and unsoldering machines for connecting or disconnecting multiple lead components on printed circuit boards.

It is in practice difficult and tedious to remove or replace a multiple lead printed circuit board component to effect a repair. When removal is required it is difficult to melt individually the solder joints connecting each lead to the circuit board and it is also difficult to remove the molten solder, especially if the leads are small and are soldered into small holes in the board. Especially is it difficult to get rid of the molten solder if the joints are made to the conductive material in so-called "plated through" holes or eyelets in the board. These difficulties are much reduced or eliminated if all the joints securing the component to the board are melted simultaneously so that the component can be removed before the solder resolidifies.

Attempts have been made to achieve this by melting all the joints simultaneously by means of a soldering iron with a large specially shaped "bit." This, however, involves differently shaped irons for use with components of different design. Moreover such irons need very skillful handling because the bit must be correctly aligned with all the joints to be melted simultaneously. In addition such an iron, when in contact with the board, heats the conductive (usually copper) connection tracks on the board and is apt to cause these conductive tracks to lose adhesion to the insulating substrate of the board. If the iron is not very skillfully handled it can easily damage one or more of the tracks.

Another suggested way of meeting the difficulties is to use a specially shaped nozzle to blow hot air—hot enough to melt the solder—at the joints. Again, very skillful handling is necessary because such a nozzle has to be properly aligned with the joints. Although, with this expedient, there is no iron physically to damage the conductive tracks on the board, the transfer of heat to the joints is inefficient and accordingly the hot air blast must be kept on for a relatively long time and there is consequently considerable risk of scorching the substrate or making the tracks lose adhesion.

The foregoing difficulties and defects can be overcome by using a so-called wave soldering machine which, as is well known, is a machine by means of which all the joints to be simultaneously made or broken are brought into contact with the surface of a mass of molten solder. If such a machine is used a component can be easily and cleanly removed by gently pulling on it, for all the joints will come free when contact with the solder takes place, However known wave soldering machines, though very satisfactory for factory use, are so bulky and heavy as to be quite impractical for use "in the field."

The main object of this invention is to provide a simple, compact and easily transportable machine which will operate in the general manner of a known wave soldering machine but shall be nevertheless well suited for use "in the field."

According to this invention a machine for simultaneously unsoldering a multiple connection component on a printed circuit board comprises a pot adapted to hold liquid at a temperature above the melting point of the solder of the joints to be unsoldered; a displacement piston in said pot and slidable therein with a liquidtight fit between the periphery of the piston and the interior wall of the pot; means for depressing said piston in said pot; a channel through said piston and adapted to permit liquid displaced by depression of said piston in said pot to be forced up through said channel; and means for so positioning a component to be unsoldered that when the piston is depressed the uppermost surface of the displaced liquid forced up said channel is brought into contact with the joints to be unsoldered.

If the machine is required only to unsolder joints the pot may contain any suitable liquid of sufficiently high temperature, e.g., hot oil. It is, however, preferred to use molten solder in the pot because then the machine can be used for soldering or unsoldering, and also because molten solder transfers heat to the joints to be unsoldered more rapidly than oil. For soldering the board with its component would be put in place on the machine and the piston depressed and released. For unsoldering the board with its component would be put in place on the machine and the component gently pulled while the piston is depressed.

Preferably the piston has at least one auxiliary channel positioned and arranged to act as a return channel for returning surplus displaced hot liquid to the main body thereof when the piston is released to its normal position. Thus, for example, the first-mentioned channel could be a vertical channel axially through the piston and the auxiliary channel could be a downwardly inclined radial channel leading to said first-mentioned channel from a point in the peripheral surface of the piston, said point being, when the piston is in its normal released position, above the top of the liquidtight sliding joint between the piston and the spot.

Suitable materials for the pot and the piston are cast iron or ceramic since these materials are not wetted by solder and do not contaminate solder. The piston should float in molten solder so that it returns automatically when released after depression.

Preferably the upper end of the channel through the piston continues into a nozzle at the mouth of which the solder will appear when the piston is depressed. The nozzle is preferably easily removable so that it can be replaced by a different nozzle of different shape or mouth area. Thus any of a number of nozzles to suit different components can be put in place. Preferably the mouth of each nozzle is made of, or coated with, heat resistant plastic.

Preferably also an electric heating element is mounted in the pot.

Figure 2:
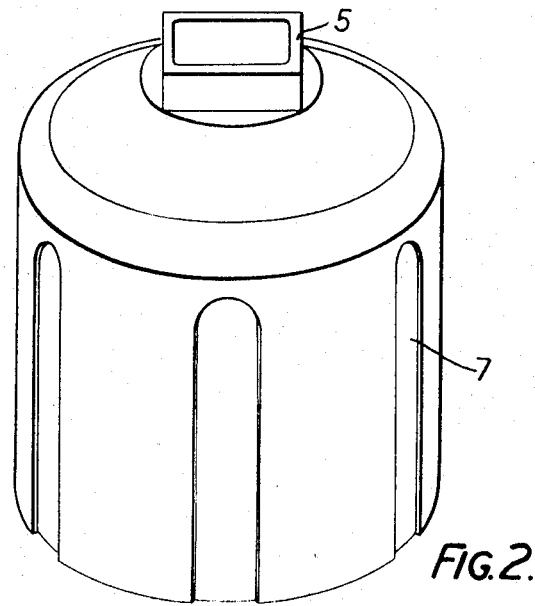
Figure 3:
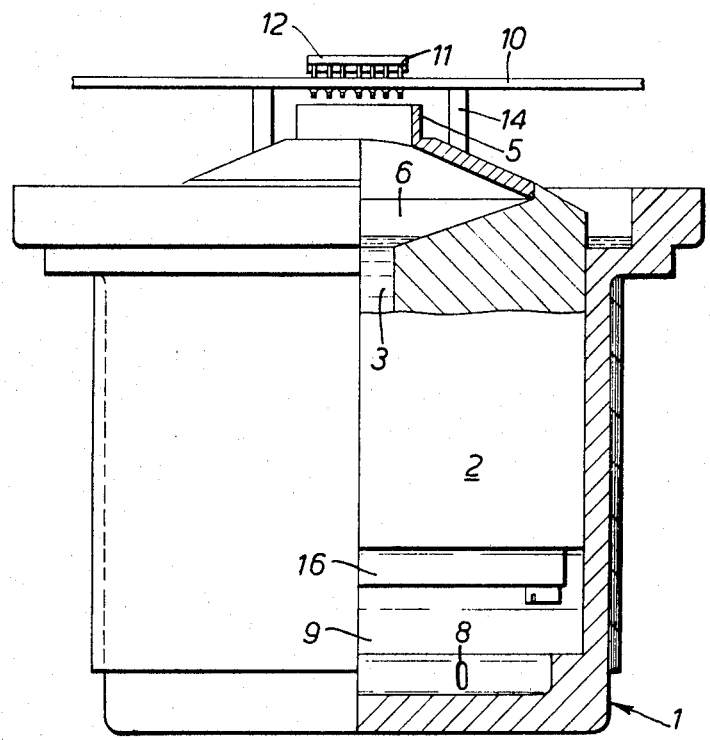

The invention is illustrated in the accompanying drawings, of which FIG. 1 and FIG. 3 are part-sectioned elevations of two embodiments of the invention and FIG. 2 is a view of an alternative form of piston for use in an embodiment of the invention. Like reference numerals refer to like parts in the figures.

Referring to FIG. 1, a soldering and unsoldering machine comprises a pot 1 suitable for holding liquid at a temperature above the melting point of solder and a displacement piston 2. The interior walls of the pot 1 are parallel so as to facilitate the movement of the piston 2. The pot and the piston may be made of any suitable material that is not "wetted" by solder, and which does not contaminate solder, e.g., cast iron or ceramic. If different materials are used for the pot and the piston care should be taken that the thermal coefficients of expansion of the materials are similar or else when the device is full of hot solder the piston may jam. For best operation the material of the piston should be of specific gravity between 3.0 and 5.0. However, if cast iron is used measures must be adopted to reduce its apparent specific gravity. This may be done by alloying with a light element such as aluminum or by providing a cavity 15 within the cast iron piston and filling this cavity with aluminum. The exposed surface of the aluminum must be covered with a plate 16 to avoid contamination of the solder. The piston 2 is provided with a central channel 3 which is bored right through the piston, and at least one further auxiliary channel 4 is also provided leading from the top of the wall of the piston to the central channel 3. At the top of the piston the central channel 3 is broadened and is provided with a nozzle 5 which is of a shape and size to suit the component which is to be soldered or unsoldered. The top of the nozzle 5 is made of or coated with a suitable heat resistant plastic, e.g., a cross-linked irradiated polymer, so as to reduce the chance of mechanical damage to a printed board. The nozzle 5 is easily removable so that a suitable nozzle can be used for each component. The pot 1 is provided with a thermostatically controlled heating element 8 and may be provided with a handle (not shown) to facilitate carrying the device from one location to another.

In order to use the device the pot 1 is filled with solder 9 or oil, which is heated by the heating element 8. The piston 2 is floated on the molten material, and a printed board 10 is placed on the piston 2 with the leads 11 of the component 12 to be soldered or unsoldered projecting into the nozzle 5. Downward pressure is manually applied to the board, and the piston moves downwards, forcing molten solder up the channel 3 and up the auxiliary channels 4. As the piston moves downwards the ends of the channels 4 become effectively sealed by the wall of the pot 1, and so all the solder is forced up the channel 3. The air displaced by the solder escapes by a small notch 13 in the nozzle 5. When the air has been fully displaced a change in the resistance to the downward movement of the piston is felt, and the downward pressure applied is reduced. The solder is now in contact with the leads 11 of the device 12. If the device is to be soldered into position the board is simply held in contact with the solder for a moment, and is then released. Molten solder clinging to the leads will cool and solidify, thereby connecting the component to the board, However, if the device is to be unsoldered the molten solder in contact with the leads 11 will melt any previously formed joints, and the component 12 can then be removed from the board 10 by a suitable spring clip. As soon as the component is removed the downward pressure is released and the piston returns to its starting position.

Any solder which overflows from the nozzle 5 or escapes through the notch 13 flows down the sloping upper surface of the piston, and when the piston returns to its original position (shown in FIG. 1) this solder will drain away down auxiliary channel 4.

The cavity 6 at the top of the piston 2 has the function of storing sufficient solder when the piston is depressed to restore the piston to the normal position despite the additional dead weight of any excess solder which has overflowed during operation.

During operation, when the solder rises up the channel 3 and starts to fill the cavity 6 it flows radially outwards in the cavity carrying any dross to the periphery and ensuring that clean solder is presented to the work.

FIG. 2 shows an alternative form of piston having auxiliary channels 7. These channels may be grooves or castellations as rough-cast in the manufacture of the piston, the surface of the piston that forms a fluidtight seal with the pot being formed by machinery.

FIG. 3 of the drawings shows a second embodiment of the invention which is so similar to the first embodiment that a detailed description is unnecessary. The detail of the piston is not shown. This may be as the piston in FIG. 1 or as the piston in FIG. 2. Posts 14 are mounted on the top of the piston so that when a circuit board 10 is mounted on them the board itself is not in contact with the nozzle 5. FIG. 3 illustrates this embodiment with the appropriate portion of the board 10 positioned over the nozzle 5 supported by the posts 14 so as to be out of contact with the nozzle. When pressure is applied to the board the piston will be forced downwards and once again molten solder will rise up the central channel 3 and into the nozzle 5. The solder will well up and flow over the lip of the nozzle 5 and if the circuit board 10 is suitably positioned the solder will come in contact with the ends of leads 11. When the piston returns to its original position the solder which has flowed over the edge of nozzle 5 drains away down auxiliary channels 4 and 7 (not shown).

It will be seen that in this embodiment the nozzle 5 does not touch the circuit board and thus it is not necessary to coat the top of the nozzle with plastic or to provide a notch to let the air displaced by the solder escape.

This embodiment also may be used for soldering or unsoldering as an interrupted solder-weir. The duration of the interrupted flow may be made longer in time by the use of a larger diameter piston 2 and pot 1 for the same size of nozzle 5.

We claim:

1. A machine for simultaneously unsoldering soldered joints of a multiple connection component on a printed circuit, said machine comprising a pot; liquid in said pot means raising the temperature of said liquid to a temperature above the melting point of the solder of the joints to be unsoldered; a displacement piston in said pot and slidable therein with a liquidtight fit between the periphery of the piston and the interior wall of the pot; means for depressing said piston in said pot; a channel through said piston and adapted to permit liquid displaced by depression of said piston in said pot to be forced up through said channel; and means for so positioning a component to be unsoldered that when the piston is depressed the uppermost surface of the displaced liquid forced up said channel is brought into contact with the joints to be unsoldered.

2. A machine as claimed in claim 1 wherein said piston has at least one auxiliary channel positioned and arranged to act as a return channel for returning surplus displaced hot liquid to the main body thereof when the piston is released to its normal position.

3. A machine as claimed in claim 2 and wherein the first-mentioned channel is a vertical channel axially through the piston and the auxiliary channel is a downwardly inclined radial channel leading to said first-mentioned channel from a point in the peripheral surface of the piston, said point being, when the piston is in its normal released position, above the top of the liquidtight sliding joint between the piston and the pot.

4. A machine as claimed in claim 1 and wherein said piston is such that it will float in said liquid at said temperature in the pot so that it returns automatically when released after depression.

5. A machine as claimed in claim 1 in which the pot and piston are made of cast iron or ceramic.

6. A machine as claimed in claim 1 in which the upper end of the channel through the piston continues into a nozzle the mouth of which is made of, or coated with, heat-resistant plastic.

7. A machine as claimed in claim 6 in which the nozzle is easily removable so that it can be replaced by a different nozzle of different shape or mouth area.

8. A machine as claimed in claim 1 in which an electric heating element is mounted in the pot.

9. A machine as claimed in claim 1 wherein the liquid in the pot is solder.

10. A machine for simultaneously soldering joints of a multiple connection component on a printed circuit, said machine comprising a pot; solder in said pot; means for raising the temperature of said solder to at or above its melting point; a displacement piston in said pot and slidable therein with a molten soldertight fit between the periphery of the piston and the interior wall of the pot; means for depressing said piston in said pot; a channel through said piston and adapted to permit molten solder displaced by depression of said piston in said pot to be forced up through said channel; and means for so positioning a component to be soldered that when the piston is depressed the uppermost surface of the displaced molten solder forced up said channel is brought into contact with the joints to be soldered.

* * * * *